WOOD TYPE SPECTACLES,
237 No. 50,373.

BEST AVAILABLE COPY

E. A. STRATTON & C. M. STRATTON.

Improvement in the Metal Corner-Pieces for Protecting the Corners of Wooden-Bodies.

No. 4,365. Reissued May 2, 1871.

Witnesses.

Harry King
Wm. T. Dodge

Inventors.

E. A. Stratton
C. M. Stratton.
by Dodge & Munn
Attys

United States Patent Office.

EDWIN A. STRATTON AND CHARLES M. STRATTON, OF GREENFIELD, MASSACHUSETTS.

Letters Patent No. 100,463, dated March 1, 1870; reissue No. 4,365, dated May 2, 1871.

IMPROVEMENT IN METAL CORNER-PIECES FOR PROTECTING THE CORNERS OF WOODEN BODIES.

The Schedule referred to in these Letters Patent and making part of the same.

*To all whom it may concern:*

Be it known that we, EDWIN A. STRATTON and CHARLES M. STRATTON, of Greenfield, in the county of Franklin and State of Massachusetts, have invented certain new and useful Improvements in the Protection of Corners of Levels and other articles; and we do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use our invention, we will proceed to describe it.

Our invention relates to the protection of the corners of spirit-levels or other wooden bodies; and The invention consists in the novel construction of metal corner-pieces to be applied thereto, as hereinafter more fully explained.

Figure 1:
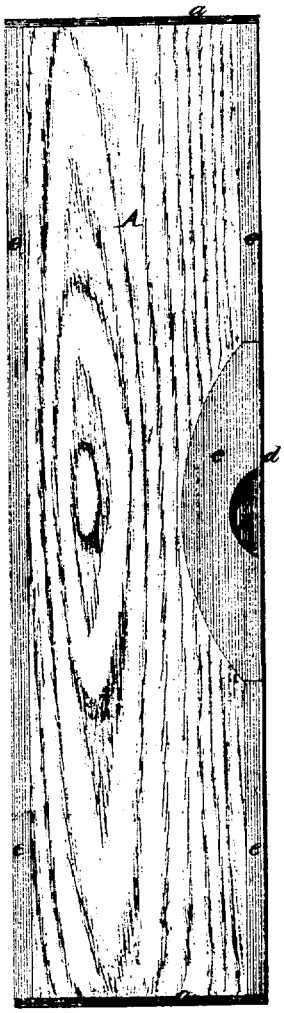
Figure 2:
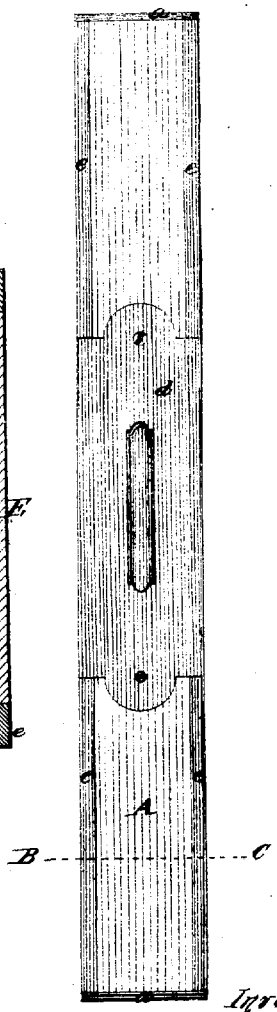

Figure 1 is a side view;

Figure 2, a top-plan view; and

Figure 3:
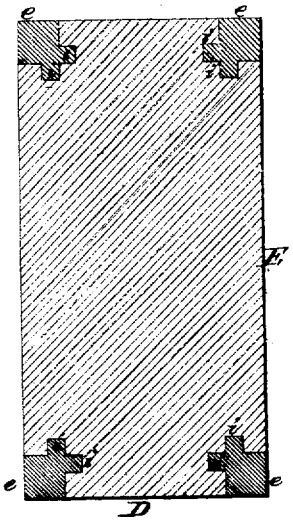

Figure 3, a cross-section of a spirit-level, showing the application of our corner-pieces.

In constructing spirit-levels, and similar articles composed mainly of wood, it is desirable to protect the corners or salient angles by the application of corner-strips or pieces of some kind; and where such strips have heretofore been used they have usually been secured by screws or pins, or some similar method.

The object of our invention is to provide a metallic corner-piece or strip that can be applied in a very simple and expeditious manner, and without the use of pins or screws.

To do this we make a corner-piece or strip of the form shown in fig. 3. This strip, in cross-section, has a rectangular body, *e*, and from its two inner faces or sides there projects a longitudinal rib, *i*, these two ribs *i* standing at right angles to each other, with their inner or adjoining faces in line with the corresponding faces of the body *e*.

These strips may be made of any suitable metal, and they may be made by planing or cutting them to the required form; or they may be drawn, like wire, through a die of corresponding form; or they may be cast, as may be found most expedient.

To apply the strips or corner-pieces thus made, it is only necessary to use a circular saw of a thickness sufficient to cut a kerf equal to the thickness of the ribs *i*. The corner of the wood is removed by simply starting in the saw at a point distant from the edge equal to the width of the body *e*, and running it along parallel with the edge to a depth equal to that of the body *e* and the flange *i* combined. The article is then turned over, and a cut is made by the saw in the same manner at right angles to the one already made, which, of course, leaves a space exactly equal in form and size, transversely, to that of the strip or corner-piece. One of the corner-pieces is then shoved endwise into this space, the flanges *i* engaging in the saw-kerfs, as shown in fig. 3, and thereby securing the corner-strip firmly and securely in place.

In order to prevent them from being shoved out of place, and for the purpose also of making a nice finish, plates *a* may be secured to the ends of the article, as shown in the drawing, they being secured by screws or in any other suitable manner.

When the corner-pieces or strips are thus applied, and the sides or faces of the article finished so as to bring them flush with the outer faces of the strips, the application is complete.

By this plan we provide a very simple, cheap, and at the same time efficient and ornamental protection for the corners of any article to which it is applied.

Having thus described our invention and the mode of applying it,

What we claim is—

The metal corner-pieces or strips consisting of the body *e* and the flanges *i*, constructed for use in the manner shown and described.

EDWIN A. STRATTON.
CHARLES M. STRATTON.

Witnesses:
AUSTIN DEWOLF,
OSCAR G. STRATTON.